United States Patent
Kincaid et al.

[11] Patent Number: 6,007,079
[45] Date of Patent: Dec. 28, 1999

[54] DIRECT ACTING END LINK FOR STABILIZER BAR

[75] Inventors: Jeffrey L. Kincaid, Clarkston; Talon T. Harvey, Shelby Township; Neil A. Wasylewski, Farmington Hills, all of Mich.

[73] Assignee: American Axle & Manufacturing, Inc., Detroit, Mich.

[21] Appl. No.: 08/863,810

[22] Filed: May 27, 1997

Related U.S. Application Data

[60] Provisional application No. 60/038,770, Feb. 14, 1997.
[51] Int. Cl.$^6$ ............................ B60G 11/20; F16C 11/00
[52] U.S. Cl. ....................... 280/93.511; 280/93.51; 280/124.106; 403/133
[58] Field of Search ................ 280/124.106, 124.13, 280/124.137, 124.149, 124.152, 93.502, 93.507, 93.508, 93.51, 93.511; 403/133

[56] References Cited

U.S. PATENT DOCUMENTS

| | | |
|---|---|---|
| 3,549,167 | 12/1970 | Haverbeck . |
| 4,875,703 | 10/1989 | Murakami . |
| 4,944,523 | 7/1990 | Hardy, Jr. et al. . |
| 5,102,160 | 4/1992 | Stowe . |
| 5,112,031 | 5/1992 | Hynds et al. . |
| 5,165,306 | 11/1992 | Hellon . |
| 5,186,486 | 2/1993 | Hynds et al. . |
| 5,352,059 | 10/1994 | Ueno et al. . |
| 5,449,193 | 9/1995 | Rivard et al. . |
| 5,551,722 | 9/1996 | Schwartz et al. . |

*Primary Examiner*—Paul N. Dickson
*Attorney, Agent, or Firm*—Harness, Dickey & Pierce, P.L.C.

[57] ABSTRACT

A suspension for a motor vehicle including an end link for interconnecting a stabilizer bar to a movable suspension. The end link includes a pair of ball and socket assemblies each having one end attached to either the stabilizer bar or the suspension member, with the opposite end of each ball and socket assembly being attached to one another.

21 Claims, 4 Drawing Sheets

DIRECT ACTING END LINK FOR STABILIZER BAR

This application claims benefit of Provisional Appln. 60/038,770, filed Feb. 14, 1997.

FIELD OF THE INVENTION

The present invention relates to a suspension system for motor vehicles and, more particularly, to an end link for connecting a stabilizer bar to a control arm of the suspension system.

BACKGROUND OF THE INVENTION

It is a common practice for motor vehicles to be equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle. Typically, the stabilizer bar is a rod-shaped member having an elongated central segment oriented to extend laterally across the vehicle and an arm segment extending longitudinally at each end of the central segment to form a generally U-shaped configuration. The central segment of the stabilizer bar is supported for rotation about its own longitudinal axis by one or more mounting brackets which are fixed to the vehicle body or frame. Most commonly, the mounting brackets are positioned in close proximity to the arm segments for minimizing any bending moments which may be induced into the stabilizer bar. The distal end of each arm segment is coupled to a control arm of the suspension system by an end link. When the vehicle is subjected to a lateral rolling force such as, for example, while the vehicle negotiates a turn, the arm segments pivot in opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar.

In response to the recent increase in consumer demand for sport-utility and performance vehicles which are typically equipped with sport-type independent suspension systems, automotive suspension designers have traditionally increased the diameter of the stabilizer bar to provide a commensurate increase in roll stiffness. Unfortunately, increasing the diameter of the stabilizer bar can also compromise the ride quality of the vehicle by making the ride feel harsher during normal driving conditions. Moreover, increasing the diameter of the stabilizer bar will also add weight and cost to the vehicle. Other design modifications which can be incorporated into the suspension system to reduce cornering roll of the vehicle body include increasing the spring rate or stiffness of the suspension springs and/or modifying the shock absorber damping characteristics. As before, these modifications can also result in a compromised ride quality by transmitting more road vibration to the vehicle and providing a harsher feel to the vehicle occupants when the vehicle is driven over small bumps or potholes in the road surface.

Figure 1:
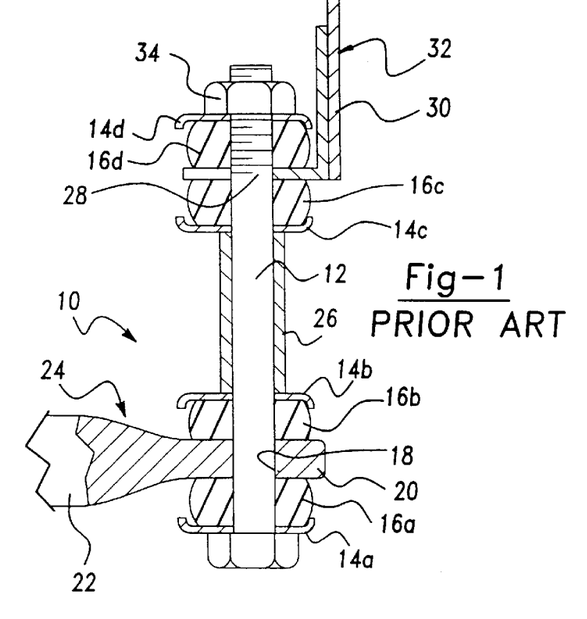
FIG. 1 is a sectional view of an exemplary prior art end link.

As noted, each end of the stabilizer bar is typically attached to a corresponding control arm by an end link. FIG. 1, shows a conventional or prior art end link which is similar in construction to that shown in U.S. Pat. No. 4,875,703 to Murakami. Specifically, end link 10 is composed of a bolt 12 onto which is placed a first washer 14a and a first rubber bushing 16a. Bolt 12 is then passed through a hole 18 provided in a flattened end 20 of an arm segment 22 of a stabilizer bar 24. Thereafter, a second rubber bushing 16b and second washer 14b are placed over bolt 12 as shown. Next, a rigid cylindrical spacer 26 is placed over bolt 12 as are a third washer 14c and a third bushing 16c. Bolt 12 then passes through a bore 28 formed in a control arm of the suspension system which, in the present example, is a bracket 30 attached to or integrally formed as part of an upper control arm 32. A fourth rubber bushing 16d and a fourth washer 14d are then placed over bolt 12 and a nut 34 is fastened to the end of bolt 12 to secure the assembly together. Rubber bushings 14a through 14d are provided to allow control arm 30 and arm segment 22 of stabilizer bar 24 to pivot relative to one another as the suspension travels through its range of motion. This pivoting action, typically referred to as angularity, is caused by the fact that control arm 30 pivots in a plane which is substantially perpendicular to the plane through which arm segment 22 of stabilizer bar 24 pivots. Several variations of the prior art end link just described have been disclosed in U.S. Pat. Nos. 4,875,703; 4,944,523; 5,449,193; and 5,551,722.

One disadvantage of the system just described is that the rubber bushings, while necessary to allow for angularity, reduce the initial effectiveness of the stabilizer bar. In fact, the stabilizer bar does not begin to experience torsional forces and act to correct the roll condition of the vehicle until the rubber bushings have been substantially compressed and, in affect, have become solid members. This initial lack of stabilizing action allows the vehicle to gain momentum in the roll direction. This momentum must be overcome by the torsional forces of the stabilizer bar in addition to the forces which are imparted by the cornering action. Thus, this initial "softness" in roll rigidity often gives the driver a perception that the vehicle is not properly responding to the steering input. While various shapes and stiffness for the rubber bushings have been developed over the years to minimize this affect, a limiting design constraint is that the system must remain pliable enough to accommodate the angularity between the stabilizer bar and the suspension control arm.

SUMMARY OF THE INVENTION

The present invention provides a suspension assembly including a pair of end links which interconnect the opposite ends of a stabilizer bar to a pair of suspension members. The stabilizer bar has a central segment and arm segments extending from each end of the central segment. The end links interconnect the distal ends of the arm segments to the suspension members. Each end link includes a pair of ball and socket assemblies which are connected to one another at a first end and are connected to the stabilizer bar and the suspension member at the other end. The ball and socket assemblies provide for and accommodate angularity between the stabilizer bar and the suspension member as the suspension travels through its range of motion while also eliminating or reducing the amount of compliance that is experienced before the stabilizer bar begins to urge the suspension member its normal position during vehicle maneuvers.

As a further feature of the present invention, the end links can be assembled from a common set of components for use in a variety of different suspension applications to accommodate different length requirements. As such, this modular arrangement permits end links assembled from such a common set of components to be used in both original equipment and replacement part applications.

DETAILED DESCRIPTION OF THE INVENTION

In general, the present invention is directed to an end link for connecting a stabilizer bar to a suspension member, such as a control arm, in a vehicle suspension. The end link of the present invention is adapted to replace most conventional end links and to provide improved performance without requiring modification of the other components associated with the vehicle suspension. Thus, the end link of the present invention may be utilized with a wide variety of suspension systems and is not intended to be limited to the particular application described herein.

Figure 2:
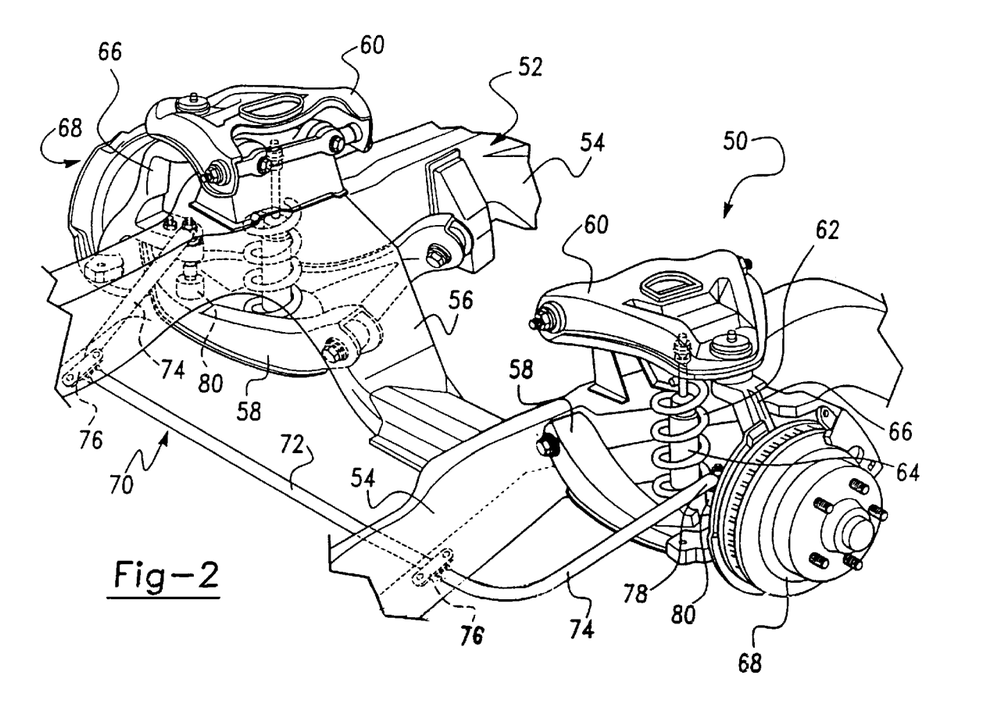
FIG. 2 is a perspective view of an exemplary independent front wheel suspension system into which the present invention is incorporated.

FIG. 2 shows an independent front wheel suspension system, generally indicated at 50, of the type having upper and lower control arms and a strut assembly at each wheel which are suspended from the vehicle frame. Reference will be made to a vehicle frame in the present disclosure, yet those skilled in the art will recognize that many current vehicles do not have a frame as such but instead have regions of the body which act as an integrated frame structure. With this in mind, frame 52 is shown to partially include a pair of longitudinal side rails 54 and a crossbeam 56.

Suspension system 50 includes a long lower control arm 58 and a short supper control arm 60 which are both pivotally attached to frame 52. A strut assembly having a helical coil spring 62 and a strut damper 64 is retained between an intermediate portion of lower control arm 58 and frame 52 to support the weight of the vehicle and any loads which are transmitted through lower control arm 58. Upper control arm 60 is connected to lower control arm 58 by a steering knuckle 66. A hub and rotor assembly 68 is rotatably attached to a spindle portion (not shown) of steering knuckle 66 such that a wheel and tire (also not shown) may be mounted thereon. A stabilizer bar 70 is shown to include an elongated central segment 72 which extends laterally across the vehicle, and a pair of arm segments 74 which extend longitudinally along the vehicle at each end of central segment 72. Central segment 72 is rotatably attached to frame rails 54 by a pair of mounting brackets 76. A distal end 78 of each arm segment 74 is connected to a corresponding lower control arm 58 by an end link 80 made in accordance with the teachings of the present invention.

Figures 3, 4, 5:
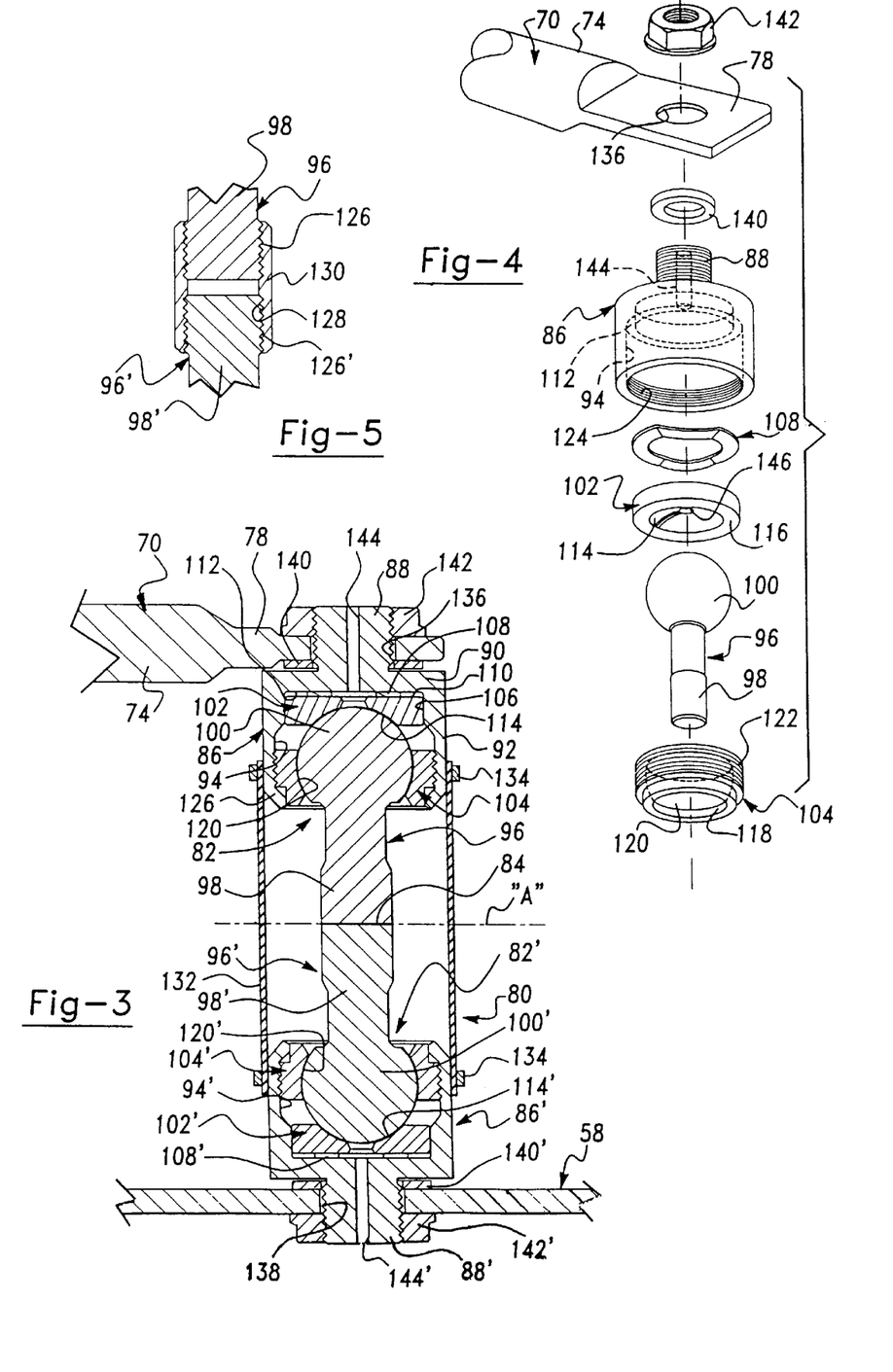
FIG. 3 is a sectional view of a portion of the suspension system shown in FIG. 2 and which illustrates an end link made in accordance with one preferred embodiment of the present invention.
FIG. 4 is a partial exploded perspective view of the end link shown in FIG. 3.
FIG. 5 is a partial section view showing a modified version of the end link shown in FIG. 3.

Referring to FIGS. 3 and 4, end link 80 is shown fastened to stabilizer bar 70 at one end and to lower control arm 58 at its opposite end. In general, the embodiment shown is symmetrical about a horizontal plane, identified by construction line "A". In fact, end link 80 is assembled from a set of components including two ball and socket assemblies 82 and 82' which are rigidly interconnected by suitable means such as, for example, a weld, as shown along weld line 84. Due to the similarity of the components associated with ball and socket assembly 82' with respect to the components of ball and socket assembly 82, its components are identified with the same reference numerals but having a primed designation.

Ball and socket assembly 82 includes a hollow cylindrical housing 86 having an upstanding threaded post 88, a disc portion 90 and an annular wall 92 projecting generally perpendicular from disc portion 90 so as to define a socket cavity 94. Ball and socket assembly 82 also includes a ball stud 96 having a shank segment 98 and a ball segment 100 which is retained in cavity 94 between a spring seat 102 and a ball seat 104. Spring seat 102 is shown inserted into a reduced diameter portion 106 of cavity 94 with a belleville spring washer 108 positioned between a planar end face 110 of housing disc portion 90 and a planar end face 112 of spring seat 102. A partial spherical seat surface 114 extends inwardly from the opposite planar end face 116 of spring seat 102 when assembled. Seat surface 114 is adapted to engage a portion of the spherical external surface of ball segment 100. Prior to assembly of ball stud 96 into housing 86, its shank segment 98 is passed through a bore 118 formed through ball seat 104 such that another portion of the spherical exterior surface of ball segment 100 engages a partial spherical seat surface 120 formed in ball seat 104 and which communicates with bore 118. To provide means for securing ball stud 96 within housing 86, external threads 122 formed on ball seat 104 are threaded into internal threads 124 formed in cavity 94 of housing 86. Ball seat 104 is tightened into housing 86 until a desired torque is reached. Thereafter, a distal end of ball seat 104 is inwardly swaged or crimped to create an inward lip flange 126 for preventing ball seat 98 from unthreading itself during use. As an alternative, a welded joint may be used in place of lip flange 126. As a further alternative, ball seat 104 need not be threaded to housing 86 but instead may be retained therein simply by crimping of the distal end to again create lip flange 126.

As previously mentioned and clearly shown in FIG. 3, shank segment 98 of ball stud 96 is connected to shank segment 98' of ball stud 96' along joint line 84 by welding or other methods for rigidly fixing ball and socket assemblies 82 and 82' together. Any typical methods of welding, including friction welding or laser welding, are within the contemplated scope of this invention. As an alternative to welding, FIG. 5 partially illustrates shank segments 98 and 98' as having external threads 126 and 126', respectively, formed thereon which are threaded into internal threads 128 of a threaded collar or connector 130. Such a threaded connection permits the overall length of end link 80 to be varied such that end link 80 can be used in a variety of different suspension applications. Regardless of the method for their connection, once shank segments 98 and 98' have been connected, a flexible tubular seal 132 is slipped over ball and socket assemblies 82 and 82' with its ends secured to housings 86 and 86' in a suitable manner, such as by clamp rings 134 and 134'.

As noted, end link 80 is adapted for connection between control arm 58 and stabilizer bar 70. To this end, a bore 136 is formed in end portion 78 of each arm segment 74 of stabilizer bar 70 while a corresponding bore 138 is formed in each lower control arm 58. A washer 140 is mounted on threaded post 88 of housing 86 which is then inserted through bore 136 in arm segment 78. A suitable fastener, such as lock nut 142, is threaded onto threaded post 88 and tightened to a suitable torque level. In a similar manner, a washer 140' is mounted on threaded post 88' of housing 86' which is then inserted through bore 138 in control arm 58. A lock nut 142' is then tightened onto threaded post 88' to a suitable torque level. In this manner, each end link 80 is secured between an arm segment 74 of stabilizer bar 70 and one a lower control arm 58.

Figures 6, 7:
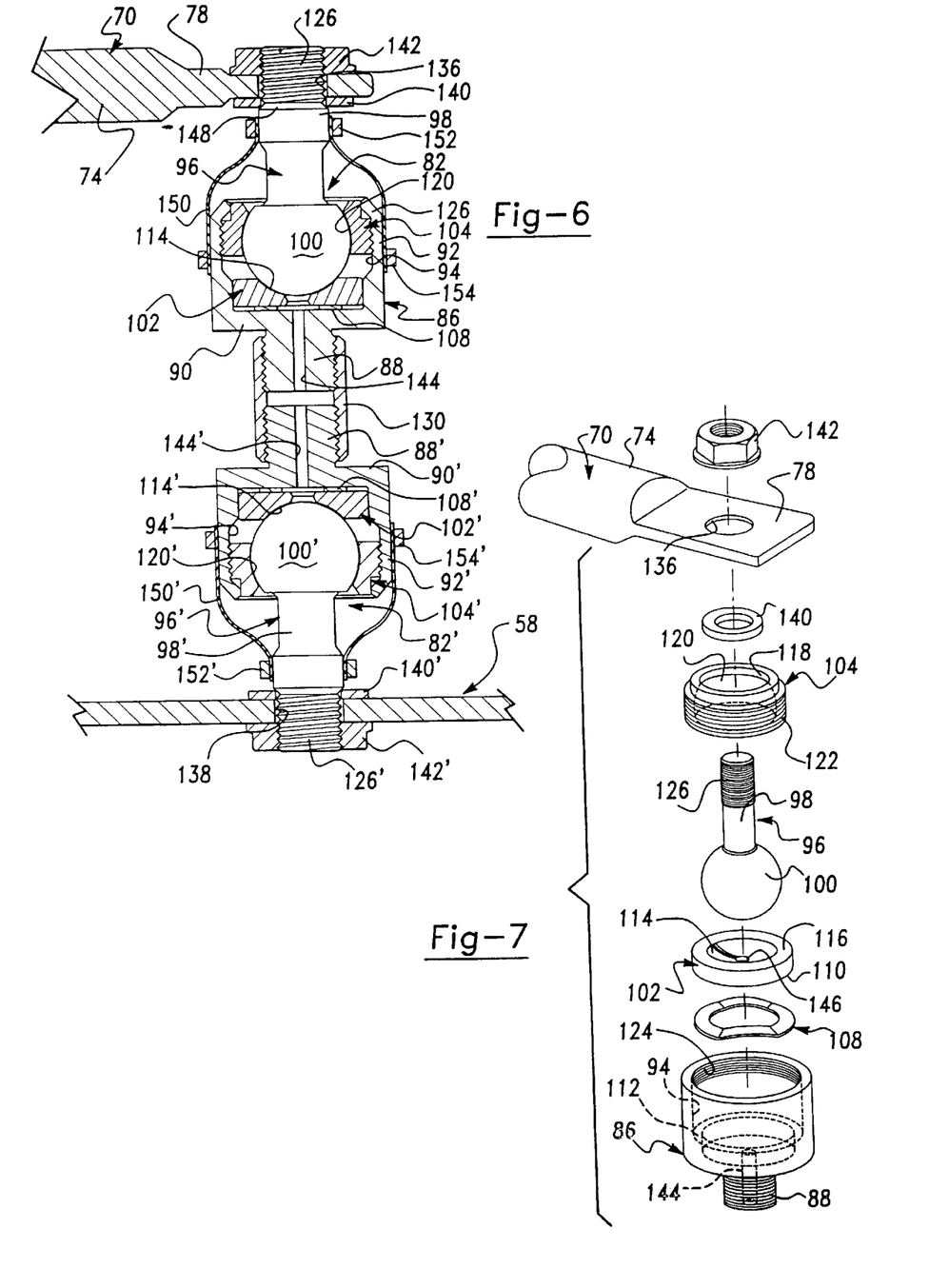
FIG. 6 is a sectional view of a portion of the suspension system shown in FIG. 2 and which illustrates an end link made in accordance with another preferred embodiment of the present invention.
FIG. 7 is a partial exploded perspective view of the end link shown in FIG. 6.

An end link 180 according to another embodiment of the present invention is shown in FIGS. 6 and 7 wherein similar components thereof are identified by like reference numbers used to describe end link 80. In general, the component of end link 180 are substantially similar to those of end link 80 with the exception that shank segments 98, 98' are now shown to include external threads 126, 126' in a manner similar to that shown in FIG. 5. Accordingly, end link 180 includes a pair of ball and socket assemblies 82 and 82' which are joined together by threaded connector 130 securing threaded post 88 on housing 86 to threaded post 88' on housings 86'. Threaded connector 130 can be provided in varying lengths thereby allowing end link 180 to be assembled at various overall lengths for use in retrofit applications into existing vehicle suspensions originally equipped with prior art type end links and/or to allow flexibility of design for the suspension engineer. While threaded connector 130 is shown to threadingly engage posts 88 and 88', connector 130 could also be welded thereto, with or without threads, or joined in another method now known or later developed, without deviating from the spirit of the present invention.

End link 180 is secured between stabilizer bar 70 and control arm 58 by inserting threaded portion 126 of shank segment 98 through bore 136 in end 78 of arm segment 74 and securely threading locking nut 142 thereon. Preferably, washer 140 is retained between a shoulder 148 formed on shank segment 98 and end 78 of arm segment 74, with washer 140 providing a larger clamping surface to minimize angular tipping of ball stud 96 relative to end 78 of arm segment 74. Similarly, shank segment 98' has washer 140 mounted thereon against shoulder 148' and which is then inserted through bore 138 in control arm 58. Lock nut 142' is tightened onto threaded portion 126' of ball stud 96'. A flexible seal 150 is also provided which is attached between housing 86 and ball stud 96 using clamp rings 152 and 154. Seal 150 prevents water and contaminants from entering ball and socket assembly 76 and hindering the smooth operation thereof.

Figure 8:
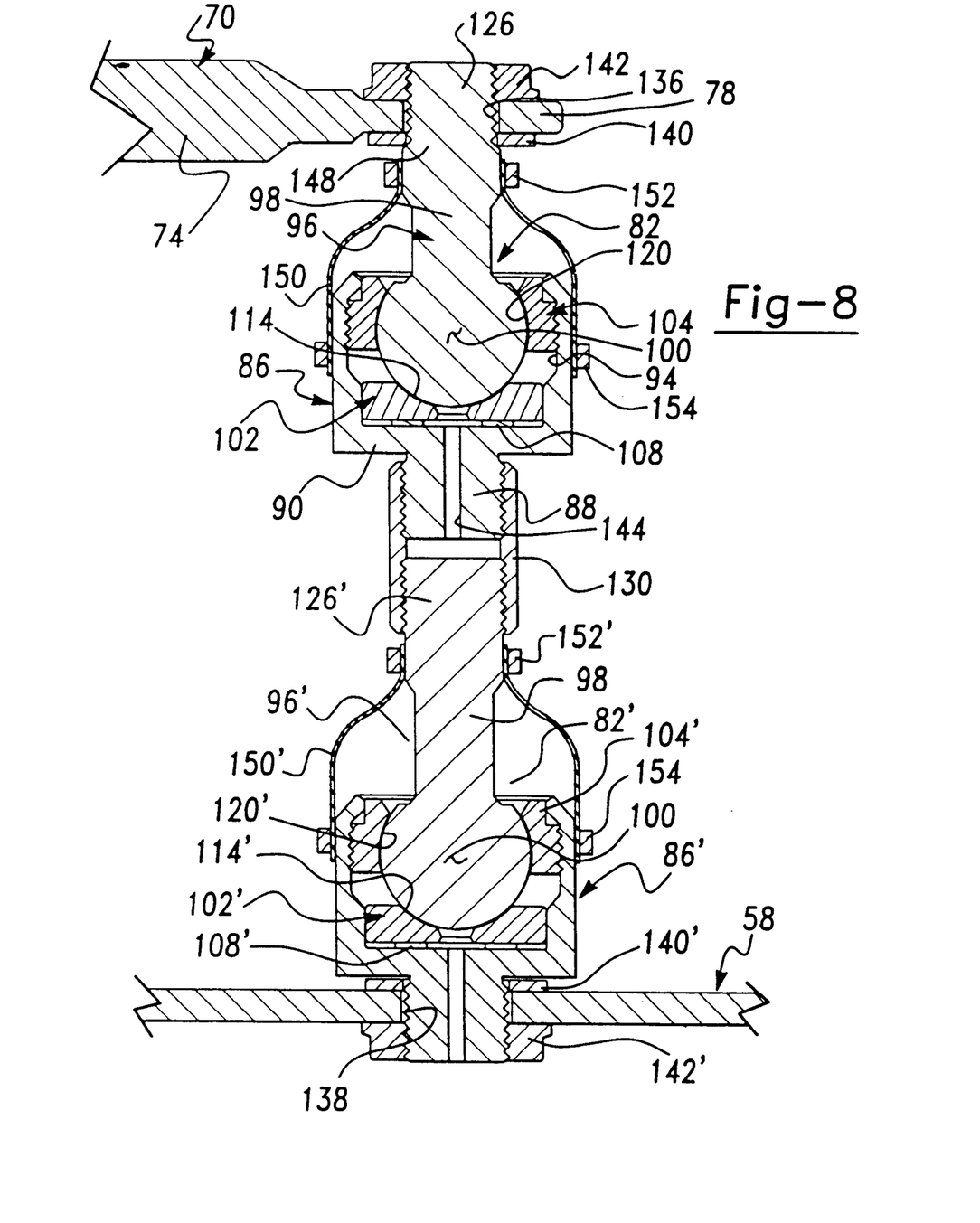
FIG. 8 is a sectional view of a portion of the suspension system shown in FIG. 2 illustrating an end link made in accordance with yet another embodiment of the present invention.

Referring now to FIG. 8, an end link 280 made in accordance with yet another embodiment of the present invention is shown. Like the previous embodiments, end link 280 is assembled from ball and socket assemblies 82 and 82' which are oriented and interconnected in an arrangement differing from that shown in FIGS. 3 and 6. Specifically, end link 280 is shown to have threaded section 126 of ball stud 96 mounted to end 78 of arm segment 74 on stabilizer bar 70 while threaded post 88' on housing 86' is mounted to control arm 58. Thus, threaded connector 130 interconnects threaded post 88 of housing 86 to threaded section 126' of ball stud 96', thereby rigidly interconnecting ball and socket assembly 82 to ball and socket assembly 82'.

As is obvious, the arrangement shown in FIG. 8 could be modified such that end link 280 is reversed in its orientation with threaded post 88' secured to stabilizer bar 70 and threaded segment 126 secured to control arm 58.

As opposed to prior art end links which utilize rubber bushings or the like in order to provide for the angularity that is required between the stabilizer bar and the control arm, each end link of the present invention disclosed herein utilizes the pair of interconnected ball and socket assemblies 82 and 82' to allow for the angularity introduced into the suspension. One advantage of these end links is that there is virtually no initial compliance of the type inherently associated with the rubber bushing used in the prior art. As such, the present invention is designed such that there is minimal axial tolerance, the only axial compliance being that of belleville springs 108 and 108' inserted respectively between housing 86 and 86' and spring seat 102 and 102'. Belleville springs 108 and 108' acts to remove lash from the system and provide for wear compensation. The lack of deflection or compliance within the components of end links 80, 180 and 280 provides a more direct and instantaneous communication of movement between control arm 58 to stabilizer bar 70. As a result of this improved communication, during cornering maneuvers the vehicle is not allowed an initial period of lateral body roll before stabilizer bar 70 begins to urge each control arm 58 toward its normal position. The effect of this direct communication is characterized as the vehicle driver having a crisper or more responsive tactile feeling of control with the perception of improved response to the steering input. Lubrication can be provided to assemblies 82 and 82' to minimize wear and encourage smooth operation. In order to provide lubrication, a grease fitting (not shown) can be fastened to an axial passage 144 formed in threaded post 88 or the end link 80 be of a sealed "lubricated for life" type wherein lubrication is deposited prior to assembly of the components. A bore 146 in spring seat 102 permits lubrication to communicate with ball segment 100 and mating spherical surfaces 114 and 120. In the alternative arrangements presented in FIGS. 6 and 8, axial passage 144 could instead be provided through ball stud 96 or wall 92 of housing.

While each embodiment of the present invention can generally be used interchangeably in various suspension systems, end link 80 is well-suited for systems with tight packaging requirements since the distance between ball segments 100 and 100' can typically be greater for a given overall length. Further, end links using connector 130 have the advantage of permitting adjustment to the overall length. As is not uncommon, any of the systems disclosed herein work well individually with a given suspension system but one may be favorable over the other because of a great number of factors, including but not limited to those mentioned above. In addition, the end links constructed according to any embodiment of the present invention can be used in vehicular suspension systems to connect stabilizer bar 70 to any desired suspension member instead of control arm 58 if the application dictates such an arrangement.

Note that while ball and socket assemblies 82 and 82' are described and illustrated as being generally identical to one another, it is contemplated by the inventors that the pair of ball and socket assemblies interconnected to form an end link may differ from one another as to dimensional sizes, shapes, and other design factors which do not hinder the coordinated function and connection therebetween.

The foregoing discussion discloses and describes several embodiments of the present invention. One skilled in the art will readily recognize from such discussion, and from the accompanying drawings and claims, that various changes, modifications can be made therein without departing from the true spirit and fair scope of the invention as defined in the following claims.

What is claimed is:

1. An end link adapted for interconnecting a stabilizer bar to a suspension member within a vehicular suspension system, the end link comprising:
   a first ball and socket assembly including a first housing and a first ball stud having a first shank segment and a first ball segment, said first shank segment adapted to be secured to the stabilizer bar;
   a second ball and socket assembly including a second housing and a second ball stud having a second shank segment and a second ball segment, said second shank segment adapted to be secured to the suspension member; and
   a connector interconnecting said first housing to said second housing, said connector including means for permitting adjustment of the spacing between said first and second ball and socket assemblies to vary the overall length of said end link.

2. The end link of claim 1 wherein each of said first and second housings includes a post such that said connector is secured to said posts.

3. The end link of claim 1, wherein each of said first and second shank segments has a threaded portion, said threaded portions are adapted to extend through respective bores formed in the stabilizer bar and the suspension member and secured thereto by a lock nut.

4. An end link adapted for interconnecting a stabilizer bar to a suspension member within a vehicular suspension system, the end link comprising:
   a first ball and socket assembly adapted to be secured to one of the stabilizer bar and the suspension member, said first ball and socket assembly including a first housing having a first post formed thereon and a first ball stud having a first shank segment and a first ball segment;
   a second ball and socket assembly adapted to be secured to the other of the stabilizer bar and the suspension member, said second ball and socket assembly including a second housing having a second post formed thereon and a second ball stud having a second shank segment and a second ball segment; and
   a connector interconnecting said first and second ball and socket assemblies such that said connector is adapted to interchangeably couple said first shank segment and said first posts with said second shank segment and said second posts.

5. A suspension system for a motor vehicle comprising:
   a stabilizer bar;
   a suspension member; and
   an end link interconnecting said stabilizer bar to said suspension member, said end link including a first ball and socket assembly having a first housing and a first ball stud rotatably supported from said first housing, and a second ball and socket assembly having a second housing and a second ball stud rotatably supported from said second housing, wherein said first housing is secured to said stabilizer bar, said second housing is secured to said suspension member, and said first ball stud is fixed to said second ball stud.

6. An end link adapted for interconnecting a stabilizer bar to a suspension member within a vehicular suspension system, the end link comprising:
   a first ball and socket assembly including a first ball stud having a first shank segment and a first ball segment, a first housing, and a first support mechanism for pivotally supporting said first ball segment within a first cavity, said first housing having a first post formed thereon which is adapted to be fixed to the stabilizer bar; and
   a second ball and socket assembly including a second ball stud having a second shank segment and a second ball segment, a second housing, and a second support mechanism for pivotally supporting said ball segment within a second cavity, said second housing having a second post formed thereon which is adapted to be fixed to said suspension member;
   wherein said first shank segment is coupled to said second shank segment.

7. An end link adapted for interconnecting a stabilizer bar to a suspension member within a vehicular suspension system, the end link comprising:
   a first ball and socket assembly adapted to be secured to one of the stabilizer bar and the suspension member, said first ball and socket assembly including a first housing and a first ball stud having a first shank segment and a first ball segment;
   a second ball and socket assembly adapted to be secured to the other of the stabilizer bar and the suspension member, said second ball and socket assembly including a second housing and a second ball stud having a second shank segment and a second ball segment; and
   a connector interconnecting said first housing to said second shank segment.

8. The end link assembly of claim 7, wherein each of said first and second ball and socket assemblies comprise:
   a first support mechanism for pivotally supporting said first ball segment within a first cavity defined within said first housing; and
   a second support mechanism for pivotally supporting said second ball segment within a second cavity defined within said second housing.

9. The end link of claim 7 further comprising wherein said connector permits adjustment of the spacing between said first and second ball and socket assemblies to vary the overall length of said end link.

10. The end link of claim 7 wherein each of said first and second housings includes a post extending in an opposite direction from said ball segment, whereby said post on said first housing is adapted to extend through a bore formed in the stabilizer bar and to be secured thereto, and said post on said second housing is adapted to extend through a bore formed in the suspension member and to be secured thereto.

11. The end link of claim 7 wherein said connector permits adjustment of the spacing between said first and second ball and socket assemblies to vary the overall length of said end link.

12. The end link of claim 11 wherein each of said first and second housings has a threaded post formed thereon and each of said first and second shank segments has a threaded portion, said connector engaging said threaded post on said housing of said first ball and socket assembly and said threaded shank segment on said ball stud of said second ball and socket assembly.

13. The end link of claim 12 wherein said threaded shank segment on said first ball stud is adapted to extend through a bore formed in the stabilizer bar and to be secured thereto by a locking nut, and wherein said threaded post on said second housing is adapted to extend through a bore formed in the suspension member and to be secured thereto by a second locking nut.

14. The end link of claim 8 wherein each of said first and second support mechanisms includes a spring seat having a partial spherical surface, a ball seat having a partial spherical surface, and a spring, said spring being positioned in said cavity between an end wall thereof and said spring seat, said ball segment of said ball stud being supported on said partial spherical surface of said spring seat and said ball seat, said ball seat being fixed to said housing such that said spring accommodates limited axial movement of said ball stud within said cavity.

15. An end link adapted for use in a vehicular suspension to interconnect a stabilizer bar to a suspension member, said end link comprising:
   a first ball stud having a first shank segment and a first ball segment, said first shank segment adapted to be secured to the stabilizer bar;
   a first housing defining a cavity within which said first ball segment is rotatably supported, said first housing having a first threaded post;
   a second ball stud having a second shank segment and a second ball segment, said second shank segment adapted to be fixed to the suspension member;
   a second housing defining a cavity within which said second ball segment is rotatably supported, said second housing having a second threaded post; and
   a threaded connector threaded onto said first and second threaded posts for coupling said first and second housings together.

16. An end link for use in a vehicular suspension to interconnect a stabilizer bar to a suspension member, said end link comprising:
   a first ball stud having a first ball segment and a first shank segment which is adapted for connection to one of the stabilizer bar and the suspension member;
   a first housing defining a cavity within which said first ball segment is rotatably supported;
   a second ball stud having a second ball segment and a second shank segment which is fixed to said first housing; and
   a second housing defining a cavity within which said second ball segment is rotatably supported, said second housing adapted for connection to the other of the stabilizer bar and the suspension member.

17. The end link of claim 16 further comprising a connector for coupling said first housing to said second shank segment.

18. A suspension system for a motor vehicle comprising:
   a stabilizer bar;
   a suspension member; and
   an end link interconnecting said stabilizer bar to said suspension member, said end link including a first ball and socket assembly having a first housing and a first ball stud rotatably supported from said first housing, a second ball and socket assembly having a second housing and a second ball stud rotatably supported from said second housing, and a connector for interconnecting said first and second ball and socket assemblies, wherein one of said first housing and said first ball stud is secured to said stabilizer bar and one of said second housing and said second ball stud is secured to said suspension member, and wherein said connector interconnects the other of said first housing and said first ball stud with the other of said second housing and said second ball stud and permits adjustment of the spacing therebetween.

19. The suspension system of claim 18 wherein said first housing is secured to said stabilizer bar, said second housing is secured to said suspension member, and said connector interconnects said first ball stud to said second ball stud.

20. The suspension system of claim 18 wherein said first housing is secured to said stabilizer bar, said second ball stud is secured to said suspension member, and said connector interconnects said first ball stud to said second housing.

21. The suspension system of claim 18 wherein said first ball stud is secured to said stabilizer bar, said second ball stud is secured to said suspension member, and said connector interconnects said first housing to said second housing.

* * * * *

UNITED STATES PATENT AND TRADEMARK OFFICE
CERTIFICATE OF CORRECTION

PATENT NO.    : 6,007,079
DATED         : December 28, 1999
INVENTOR(S)   : Jeffrey L. Kincaid, Talon T. Harvey, Neil A. Wasylewski It is certified that error appears in the above-identified patent and that said Letters Patent is hereby corrected as shown below:

Title page,
Under item [56] References cited, the following references were not included on the printed patent:

| | | |
|---|---|---|
| 3,009,712 | 11/1961 | Williams |
| 4,197,027 | 04/1980 | Scheerer |
| 1,817,529 | 08/1931 | Skillman |
| 4,360,284 | 11/1982 | Brandenburg |
| 1,929,807 | 10/1933 | Casper |
| 1,912,780 | 06/1933 | Lautz |
| 5,116,159 | 05/1992 | Kern et al |
| 5,704,726 | 01/1998 | Nemoto |

Column 2,
Line 59, after "member" insert -- to --

Column 3,
Line 52, "supper" should be -- upper --

Column 5,
Line 15, delete "one"

Column 6,
Line 18, "acts" should be -- act --

Signed and Sealed this

Eleventh Day of September, 2001

Attest:

NICHOLAS P. GODICI
Attesting Officer    Acting Director of the United States Patent and Trademark Office